United States Patent
Kim et al.

(10) Patent No.: US 8,897,785 B2
(45) Date of Patent: *Nov. 25, 2014

(54) MULTI-MODE MOBILE COMMUNICATION TERMINAL AND MODE SWITCHING METHOD THEREOF

(71) Applicants: Nam-Gun Kim, Seoul (KR); Young-Lak Kim, Yongin-si (KR); Hyun-Wook Kim, Seongnam-Si (KR); Chang-Moon Han, Seoul (KR)

(72) Inventors: Nam-Gun Kim, Seoul (KR); Young-Lak Kim, Yongin-si (KR); Hyun-Wook Kim, Seongnam-Si (KR); Chang-Moon Han, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,735

(22) Filed: Mar. 28, 2013

(65) Prior Publication Data

US 2013/0217394 A1    Aug. 22, 2013

Related U.S. Application Data

(63) Continuation of application No. 13/236,076, filed on Sep. 19, 2011, now Pat. No. 8,503,397, which is a continuation of application No. 10/591,822, filed as application No. PCT/KR2005/000600 on Mar. 4, 2005, now Pat. No. 8,094,619.

(30) Foreign Application Priority Data

| | | |
|---|---|---|
| Mar. 4, 2004 | (KR) | 10-2004-0014700 |
| Apr. 2, 2004 | (KR) | 10-2004-0022949 |
| Apr. 2, 2004 | (KR) | 10-2004-0022954 |
| May 13, 2004 | (KR) | 10-2004-0033866 |

(51) Int. Cl.
*H04W 36/00* (2009.01)
(Continued)

(52) U.S. Cl.
CPC .............. *H04W 36/18* (2013.01); *H04W 36/30* (2013.01); *H04W 88/06* (2013.01);
(Continued)

(58) Field of Classification Search
CPC ...... H04B 7/195; H04W 36/14; H04W 36/18; H04W 36/30; H04W 36/36; H04W 88/06
USPC ................ 455/432.1–432.2, 436–444, 550.1, 455/552.1; 370/310, 331–332, 328, 350
See application file for complete search history.

(56) References Cited

U.S. PATENT DOCUMENTS

| | | |
|---|---|---|
| 5,999,814 A | 12/1999 | Cuffaro et al. |
| 6,119,003 A | 9/2000 | Kukkohovi |

(Continued)

FOREIGN PATENT DOCUMENTS

| | | |
|---|---|---|
| CN | 00120677 | 7/2001 |
| EP | 1102506 | 5/2001 |

(Continued)

OTHER PUBLICATIONS

International Search Report for PCT/KR2005/000600.

(Continued)

*Primary Examiner* — Babar Sarwar
(74) *Attorney, Agent, or Firm* — Lowe Hauptman & Ham, LLP

(57) ABSTRACT

Disclosed is a multi-mode multi-band mobile communication terminal and a mode switching method thereof wherein a mode switching can be performed between an asynchronous network and a synchronous network by minimizing interruption in communication. According to the switching method of a multi-mode multi-band mobile communication terminal, the power of a signal received from an asynchronous network or a synchronous network is measured and the measured power of the received signal drives a modem portion, thereby switching the mode of the mobile communication terminal.

13 Claims, 13 Drawing Sheets

(51) Int. Cl.
*H04W 36/30* (2009.01)
*H04W 36/18* (2009.01)
*H04B 7/195* (2006.01)
*H04W 88/06* (2009.01)
*H04W 36/14* (2009.01)
*H04W 36/36* (2009.01)

(52) U.S. Cl.
CPC ............... *H04B 7/195* (2013.01); *H04W 36/14* (2013.01); *H04W 36/36* (2013.01)
USPC ........ 455/436; 455/435.3; 455/438; 455/440; 370/331; 370/332; 370/324

(56) References Cited

U.S. PATENT DOCUMENTS

| | | | |
|---|---|---|---|
| 6,212,173 B1 * | 4/2001 | Lindsay et al. | 370/331 |
| 6,701,149 B1 * | 3/2004 | Sen et al. | 455/436 |
| 7,151,756 B1 * | 12/2006 | Park et al. | 370/331 |
| 2001/0007552 A1 | 7/2001 | Schiff et al. | |
| 2002/0187784 A1 | 12/2002 | Tigerstedt et al. | |
| 2004/0022265 A1 | 2/2004 | Luz et al. | |
| 2004/0203985 A1 | 10/2004 | Malladi et al. | |
| 2008/0108319 A1 | 5/2008 | Gallagher | |
| 2009/0098877 A1 | 4/2009 | Chaudry et al. | |

FOREIGN PATENT DOCUMENTS

| | | |
|---|---|---|
| EP | 1119212 | 7/2001 |
| EP | 1213941 | 6/2002 |
| JP | 06-260990 | 9/1994 |
| JP | 2001-102990 | 4/2001 |
| JP | 2001-186552 | 7/2001 |
| JP | 2001-224052 | 8/2001 |
| JP | 2003-284137 | 10/2003 |
| KR | 1020010048490 | 6/2001 |
| KR | 1020010059522 | 7/2001 |
| WO | 9736452 | 10/1997 |
| WO | 9839938 | 9/1998 |
| WO | 0035234 | 6/2000 |
| WO | 0103464 | 1/2001 |
| WO | 03050976 | 6/2003 |
| WO | 2004/014011 | 2/2004 |
| WO | 2004014001 | 2/2004 |
| WO | 2004014011 | 2/2004 |

OTHER PUBLICATIONS

Chinese Office Action for 200580014311.2.
Korean Office Action for 10-2004-0022954.
Korean Office Action for 10-2004-0033866.
Japanese Office Action for 2007-501712.
Korean Notice of Allowance for 2004-0014700.

* cited by examiner

MULTI-MODE MOBILE COMMUNICATION TERMINAL AND MODE SWITCHING METHOD THEREOF

CROSS REFERENCE TO RELATED APPLICATION

The present application is a Continuation Application of U.S. application Ser. No. 13/236,076, filed on Sep. 19, 2011, which is a Continuation Application of U.S. application Ser. No. 10/591,822, filed on Jul. 13, 2007, based on International Application Number PCT/KR2005/000600 filed Mar. 4, 2005, the disclosure of which is hereby incorporated by reference herein in their entirety. Further, this application claims the priorities of Korean Patent Application Nos. 10-2004-0014700, filed on Mar. 4, 2004; 10-2004-0022954, filed on Apr. 2, 2004; 10-2004-0022949, filed on 10-2004-0033866, filed on May 13, 2004 in the KIPO (Korean Intellectual Property Office), the disclosure of which are incorporated herein in their entirety by reference.

TECHNICAL FIELD

The present invention relates to a multi-mode multi-band mobile communication terminal for supporting both an asynchronous communication network and a synchronous communication network, and more particularly to a multi-mode multi-band mobile communication terminal and a mode switching method thereof, which can perform a mode switching between an asynchronous mobile communication network and a synchronous mobile communication network while minimizing interruption in the communication.

BACKGROUND ART

The mobile communication service has continuously developed from the first generation (1G) mobile communication service mainly for voice communication of a low quality as was provided by an analogue cellular type Advanced Mobile Phone System (hereinafter, referred to as "AMPS") which started its service late in the 1980's. The second generation (2G) mobile communication service enabled an improved voice communication and a data service at a low speed (14.4 Kbps) by employing a digital cellular type Global System for Mobile (GSM) scheme, a Code Division Multiple Access (CDMA) scheme, a Time Division Multiple Access (CDMA) scheme, etc. In the $2.5^{th}$ generation (2.5G) mobile communication service, the frequency of GHz band was secured and the Personal Communication Service (PCS) available worldwide was developed, so that the 2.5G mobile communication service achieved an improved voice communication service together with a data communication service at an improved speed (144 Kbps) still low as it is.

Each of the mobile communication networks for the mobile communication services up to the $2.5^{th}$ generation includes various communication apparatuses such as a user terminal, a base station transmitter, a base station controller, a mobile switching center, a Home Location Register (HLR) and a Visitor Location Register (VLR).

The third generation (3G) mobile communication service is provided by two different kinds of systems including a Wideband CDMA (WCDMA) system and a CDMA-2000 system. The WCDMA system is an asynchronous mobile communication system proposed mainly by the 3rd Generation Partnership Project (3GPP) and the CDMA-2000 system is a synchronous mobile communication system proposed mainly by the 3GPP2. Especially for the WCDMA system, many communication service providers all over the world are providing or preparing to provide services by employing wireless protocols recommended by the International Mobile Telecommunications-2000 (IMT-2000).

The WCDMA system achieves a high communication quality and employs the spread spectrum scheme, so it is proper for transmission of even a large quantity of data. The WCDMA communication system uses an Adaptive Multi-Rate (AMR) codec having a transmit rate of 12.2 Kbps~4.75 Kbps for voice coding and supports a high mobility enough to allow even a user moving at a speed of 100 Km per hour to perform communication. Many nations are now adopting the WCDMA communication scheme, and the 3GPP constructed by organs of many countries including the United States, Europe, Republic of Korea, Japan, the People's Republic of China, etc. is now continuously developing technology specifications for the WCDMA communication.

Recently, due to the advantages of the asynchronous WCDMA system as described above, countries basically employing the synchronous CDMA-2000 network, such as the United States, Republic of Korea and the People's Republic of China, have started to construct a WCDMA network in order to provide a WCDMA service.

As a result, a mobile communication terminal capable of supporting both the synchronous communication network and the asynchronous communication network has become necessary and a Multi-Mode Multi-Band (MMMB) mobile communication terminal has appeared to meet such a necessity.

The Multi-Mode includes both a synchronous mode and an asynchronous mode, and the Multi-Band includes the frequency band of 800 MHz of the 2G mobile communication service, the frequency band of 800 MHz or 1.8 GHz of the 2.5G mobile communication service, the frequency band of about 2 GHz of the 3G mobile communication service, and a frequency band of the 4G mobile communication service to be provided in the future.

A mode switching between the asynchronous mode and the synchronous mode is necessary when the MMMB mobile communication terminal moves into an area of a synchronous communication network from an overlap area between areas of synchronous and asynchronous communication networks. According to the conventional method for mode switching, a modem for call connection with the synchronous communication network is operated after the mobile communication terminal completely escapes from the overlap area and the call connection with the asynchronous communication network is interrupted. Therefore, the mode switching according to the conventional method requires an interruption interval of at least approximately 20 seconds during which the communication is interrupted.

DISCLOSURE

Technical Problem

Therefore, the present invention has been made in view of the above-mentioned problems, and it is an object of the present invention to provide a multi-mode multi-band mobile communication terminal and a mode switching method thereof, which can perform a mode switching between an asynchronous mobile communication network and a synchronous mobile communication network while minimizing interruption in the communication. It is another object of the present invention to provide a multi-mode multi-band mobile communication terminal and a mode switching method thereof, which can minimize a ping-pong phenomenon when the mobile communication terminal performs mode switching between a WCDMA mode and a CDMA mode.

Technical Solution

According to an aspect of the present invention, there is provided a method for mode switching of a multi-mode multi-band mobile communication terminal between an asynchronous mode and a synchronous mode in an idle state, the multi-mode multi-band mobile communication terminal including an asynchronous modem for communication with an asynchronous mobile communication network and a synchronous modem for communication with a synchronous mobile communication network, the method including the steps of: (1) measuring a power of a received signal from the asynchronous mobile communication network; (2) determining if the measured power of the received signal has a value lower than a preset threshold value; (3) determining if a state in which the measured power of the received signal has a value lower than a preset threshold value is maintained during a predetermined time interval; (4) operating the synchronous modem when the state has been maintained during a predetermined time interval; and (5) converting a current communication mode into a synchronous mode and then entering into a synchronous mode idle state.

According to another aspect of the present invention, there is provided a method for mode switching of a multi-mode multi-band mobile communication terminal between an asynchronous mode and a synchronous mode in a traffic state, the multi-mode multi-band mobile communication terminal including an asynchronous modem for communication with an asynchronous mobile communication network and a synchronous modem for communication with a synchronous mobile communication network, the method including the steps of: (1) measuring a power of a received signal from the asynchronous mobile communication network; (2) determining if the measured power of the received signal has a value lower than a preset threshold value; (3) determining if a state in which the measured power of the received signal has a value lower than a preset threshold value is maintained during a predetermined time interval; (4) operating the synchronous modem when the state has been maintained during a predetermined time interval; (5) determining if a traffic state of an asynchronous mode call has ended or not; (6) determining if a radio link with the asynchronous mobile communication network has been released or not when it is determined that the traffic state of the asynchronous mode call has not ended yet; and (7) converting a current communication mode into a synchronous mode and processing a synchronous mode call with the synchronous mobile communication network through the synchronous modem when it is determined that the radio link with the asynchronous mobile communication network has been released.

According to another aspect of the present invention, there is provided a method for mode switching of a multi-mode multi-band mobile communication terminal between an asynchronous mode and a synchronous mode, the mobile communication terminal including an asynchronous modem for communication with an asynchronous mobile communication network and a synchronous modem for communication with a synchronous mobile communication network, the method including the steps of: (1) monitoring system information from the asynchronous mobile communication network; (2) checking preset parameter values in the monitored system information in order to determine whether to perform mode switching; (3) operating the synchronous modem when it is determined that the preset parameter values require mode switching; and (4) switching into the synchronous mode after operating the synchronous modem. According to another aspect of the present invention, there is provided a method for mode switching of a multi-mode multi-band mobile communication terminal between an asynchronous mode and a synchronous mode, the mobile communication terminal including an asynchronous modem for communication with an asynchronous mobile communication network and a synchronous modem for communication with a synchronous mobile communication network, the method including the steps of: (1) searching overhead message information from the synchronous mobile communication network; (2) determining if the overhead message information includes a mode switch parameter preset for mode switching; (3) operating the asynchronous modem when it is determined that the overhead message information includes a preset mode switch parameter; and (4) switching a communication mode of the mobile communication terminal into the asynchronous mode after operating the asynchronous modem.

According to another aspect of the present invention, there is provided a multi-mode multi-band mobile communication terminal including: an asynchronous modem for communication with an asynchronous mobile communication network; a synchronous modem for communication with a synchronous mobile communication network; and a mode switch controller for managing current state of the asynchronous modem and the synchronous modem and controlling activation and deactivation of the asynchronous modem and the synchronous modem based on a communication mode corresponding to a mobile communication network to which the mobile communication terminal currently belongs, wherein: when it is determined to perform mode switching, the mode switch controller operates a corresponding modem for connection with a target mobile communication network so that the corresponding modem acquires a network sync and performs registration of location; and after performing the registration of location, the mode switch controller performs communication with the target mobile communication network through the corresponding modem and deactivates another modem having been communicating with another mobile communication network.

According to another aspect of the present invention, there is provided a method for mode switching of a multi-mode multi-band mobile communication terminal between an asynchronous mode and a synchronous mode, the mobile communication terminal including modems for communication with an asynchronous mobile communication network and a synchronous mobile communication network, the method including the steps of: (1) operating a corresponding modem for connection with a target mobile communication network which is a target of mode switching, when it is determined to perform the mode switching; (2) acquiring a network sync with the target mobile communication network by the corresponding modem; (3) performing registration of location to the target mobile communication network; and (4) performing communication with the target mobile communication network through the corresponding modem and deactivating another modem having been communicating with another mobile communication network.

According to another aspect of the present invention, there is provided a method for mode switching of a multi-mode multi-band mobile communication terminal between an asynchronous mode and a synchronous mode, the mobile communication terminal including an asynchronous modem for communication with an asynchronous mobile communication network and a synchronous modem for communication with a synchronous mobile communication network, the method including the steps of: (1) switching a current mode of the mobile communication terminal into an asynchronous mode and searching for an asynchronous signal, when the mobile communication terminal receives a system message from the synchronous mobile communication network while being located within an overlap area between the asynchronous mobile communication network and the synchronous mobile communication network, the system message indicating mode switching from the synchronous mobile communication network to the asynchronous mobile communication network; (2) determining if an asynchronous signal is detected and if registration of location has been performed; and (3) when no asynchronous signal is detected or when the registration of location has not been performed yet, switching a current mode of the mobile communication terminal into a synchronous mode, waiting during a counting interval and counting a number of times for the searching, and then feedbacking to step (1).

According to another aspect of the present invention, there is provided a method for mode switching of a multi-mode multi-band mobile communication terminal between an asynchronous mode and a synchronous mode, the mobile communication terminal including an asynchronous modem for communication with an asynchronous mobile communication network and a synchronous modem for communication with a synchronous mobile communication network, the method including the steps of: (1) searching for an asynchronous signal by the mobile communication terminal in the asynchronous mode and sending a request for registration of a location of the mobile communication terminal to a corresponding asynchronous communication network when an asynchronous signal is detected; and (2) when the request for the registration of the location is rejected, switching a current communication mode of the mobile communication terminal into a synchronous mode, detecting a synchronous signal, and registering the location of the mobile communication terminal in the synchronous communication network.

Advantageous Effects

As can be seen from the foregoing, the present invention provides a multi-mode multi-band mobile communication terminal and a mode switching method thereof, which can minimize interruption in the communication when the mobile communication terminal moves from an asynchronous mobile communication network area to a synchronous mobile communication network area.

Also, the present invention provides a multi-mode multi-band mobile communication terminal and a mode switching method thereof, which can minimize a ping-pong phenomenon when the mobile communication terminal automatically performs mode switching between a WCDMA mode and a CDMA mode.

DESCRIPTION OF DRAWINGS

The foregoing and other objects, features and advantages of the present invention will become more apparent from the following detailed description when taken in conjunction with the accompanying drawings in which.

BEST MODE

Hereinafter, a mobile communication terminal according to the present invention will be described in detail with reference to FIGS. 1 through 3. First, FIG. 1 is a block diagram illustrating communication networks to which an MMMB mobile communication terminal according to the present invention connects.

Figure 1:
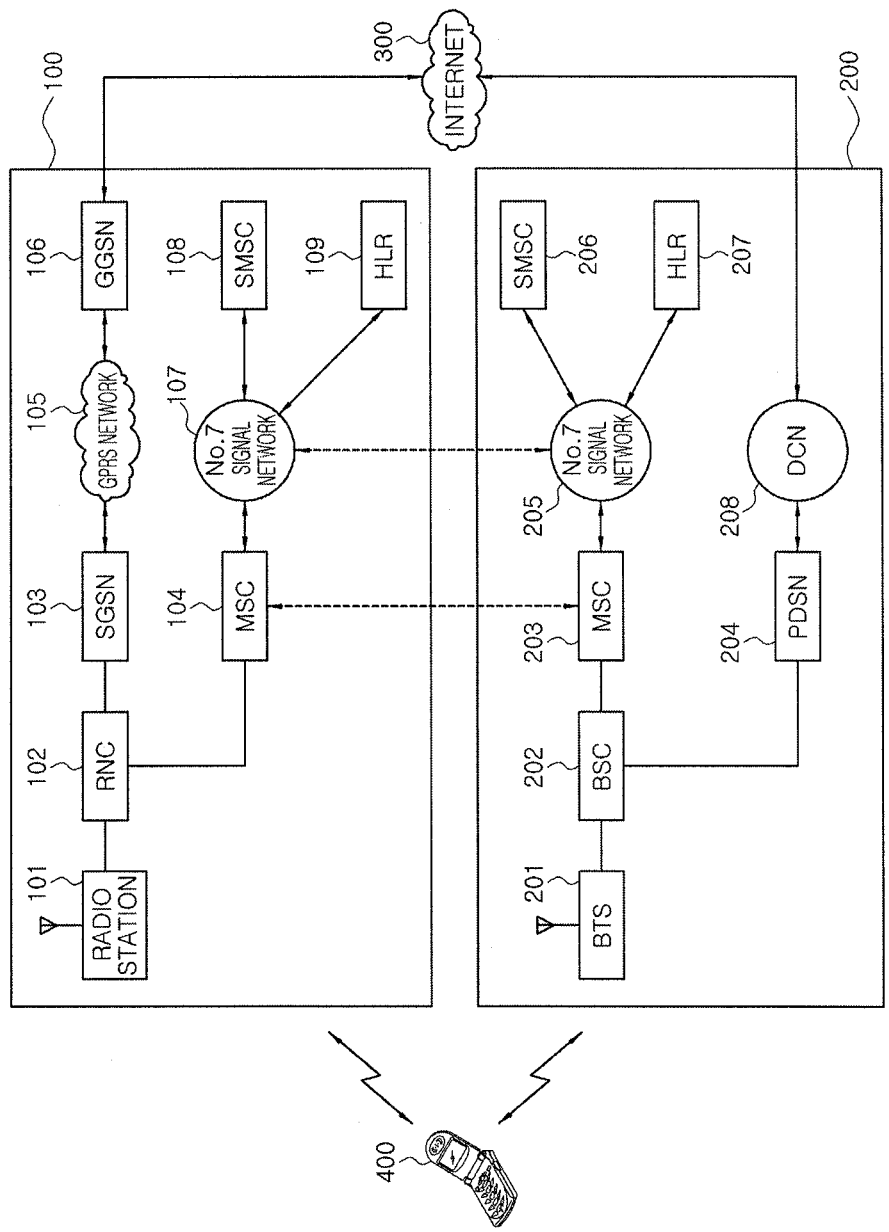
FIG. 1 is a block diagram illustrating communication networks to which an MMMB mobile communication terminal according to the present invention connects.

Referring to FIG. 1, the WCDMA network 100, which is an asynchronous communication network, includes a radio station 101 performing radio communication with a mobile communication terminal 400, a Radio Network Controller (hereinafter, referred to as "RNC") 102 for controlling the radio station 101, a Serving GPRS Service Node (hereinafter, referred to as "SGSN") 103 connected to the RNC 102 to control the mobility of the mobile communication terminal 400, and a Gateway GPRS Supporting Node (hereinafter, referred to as "GGSN") 106 for asynchronous communication network data service, which is a relay apparatus for performing the packet service control and packet data transfer through the GPRS network 105.

The RNC 102 is connected to a Mobile Switching Center (hereinafter, referred to as "MSC") 104 for performing call switching and the MSC 104 is connected to a No. 7 signal network 107 for signal switching. The No. 7 signal network 107 is connected to both a Short Message Service Center (hereinafter, referred to as "SMSC") 108 for providing a short message service and a Home Location Register (hereinafter, referred to as "HLR") 109 for managing the location information of subscribers.

Meanwhile, the CDMA2000 network 200, which is a synchronous communication network, includes a Base Transceiver Station (hereinafter, referred to as "BTS") 201 performing radio communication with the mobile communication terminal 400, a Base Station Controller (hereinafter, referred to as "BSC") 202 for controlling the BTS 201, a Packet Data Service Node (hereinafter, referred to as "PDSN") 204 connected to the BSC 202 to provide packet data, a Data Core Network (hereinafter, referred to as "DCN") 208 connected to the PDSN 204 to provide an Internet connection service, and an MSC 203 connected to the BSC 202 to perform the signal switching.

The MSC 203 is connected to a No. 7 signal network 205 for signal switching. The No. 7 signal network 205 is connected to both an SMSC 206 for providing a short message service and an HLR 207 for managing the location information of subscribers.

In the present embodiment, each of the synchronous communication network 200 and the asynchronous communication network 100 includes a separate HLR 109 or 207 for managing the subscriber information and location information. However, the synchronous communication network 200 and the asynchronous communication network 100 may share the subscriber information and location information by using only one HLR (dual-stack home location register) in the two kinds of networks.

Figure 2:
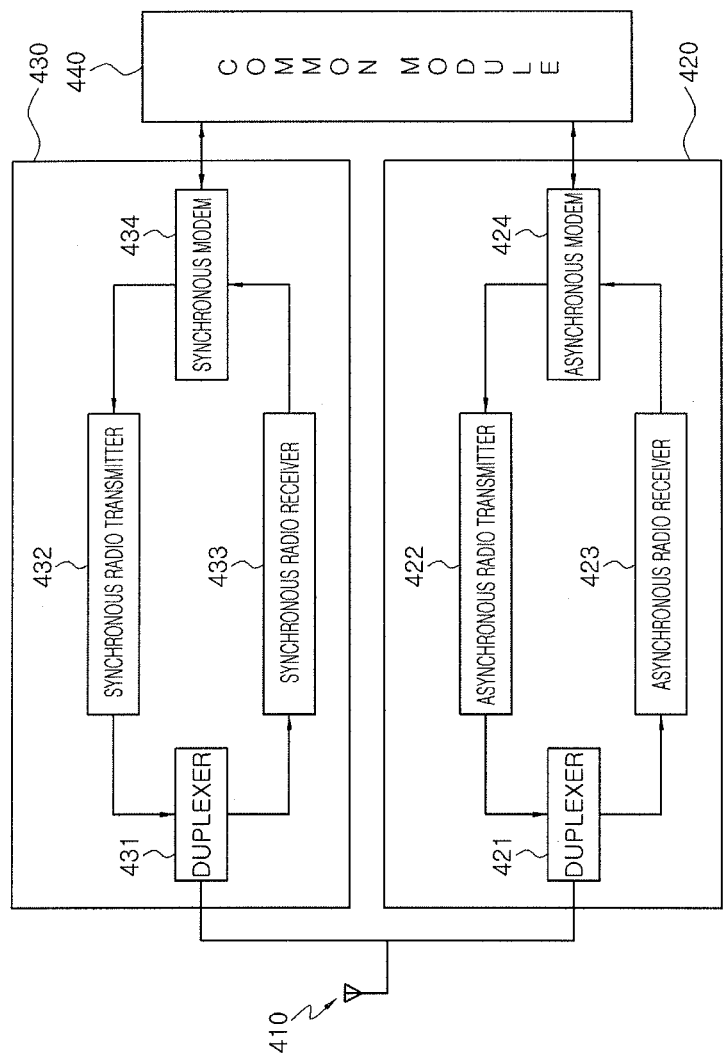
FIG. 2 is a block diagram illustrating a construction of an MMMB mobile communication terminal according to the present invention.

FIG. 2 is a block diagram illustrating a construction of an MMMB mobile communication terminal according to the present invention.

Referring to FIG. 2, an MMMB mobile communication terminal 400 according to the present invention, which supports both the synchronous mobile communication and the asynchronous mobile communication, has protocol stacks of both the synchronous mobile communication and the asynchronous mobile communication.

The MMMB mobile communication terminal 400 according to the present invention includes, in brief, an antenna 410 for transmitting/receiving radio waves to/from the synchronous communication network 200 and the asynchronous communication network 100, a synchronous radio apparatus 430 for synchronous communication, an asynchronous radio apparatus 420 for asynchronous communication, and a common module 440 for providing common resources for both the synchronous communication and the asynchronous communication.

The synchronous radio apparatus 430 includes a synchronous radio transmitter 432 for radio transmission, a synchronous radio receiver 433 for radio reception, and a synchronous modem 434. One side of each of the synchronous radio transmitter 432 and the synchronous radio receiver 433 is connected to the antenna 410 through a duplexer 431 and the other side thereof is connected to the synchronous modem 434.

The asynchronous radio apparatus 420 also includes an asynchronous radio transmitter 422 for radio transmission, an asynchronous radio receiver 423 for radio reception, and an asynchronous modem 424. One side of each of the asynchronous radio transmitter 422 and the asynchronous radio receiver 423 is connected to the antenna 410 through a duplexer 421 and the other side thereof is connected to the asynchronous modem 424.

Figure 3:
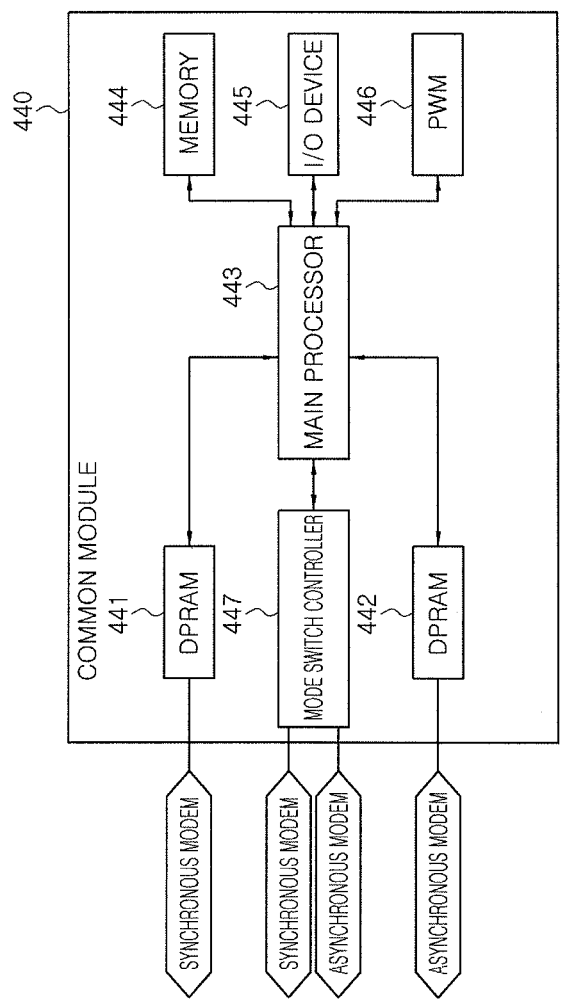
FIG. 3 is a block diagram illustrating a construction of a common module of an MMMB mobile communication terminal in detail.

FIG. 3 is a block diagram illustrating a construction of a common module of an MMMB mobile communication terminal in detail.

Referring to FIG. 3, the common module 440 of the MMMB mobile communication terminal according to the present invention includes a plurality of Dual Port RAMs (hereinafter, referred to as "DPRAMs") 441 and 442 connected to the modems 424 and 434 of the asynchronous radio apparatus 420 and the synchronous radio apparatus 430, respectively, and a main processor 443 connected to the DPRAMs 441 and 442, which performs general control of the synchronous and asynchronous communication of the mobile communication terminal 400 and execution of applications. The main processor 443 is connected to a memory 444 for storing data, an I/O device 445 for connection with peripheral devices, and a power control module (hereinafter, referred to as "PWM") 446 for power control.

Further, the common module 440 includes a mode switch controller (call manager for roaming) 447 for minimizing call interruption due to time delay during the mode switching. The mode switch controller 447 is connected to the synchronous modem 434 and the asynchronous modem 424 to perform the mode switching control. Although the present embodiment employs a separate mode switch controller 447, the mode switch controller may be embedded in the synchronous modem 434 and the asynchronous modem 424.

Therefore, the mobile communication terminal having the construction as described above can perform communication in both the asynchronous network and the synchronous network. Also, the mobile communication terminal 400 having the construction as described above may have four kinds of modes selectable by a user, which includes a dedicated asynchronous mode (WCDMA only), a preferred asynchronous mode (WCDMA preferred), a preferred synchronous mode (CDMA preferred), and a dedicated synchronous mode (CDMA only). In the dedicated asynchronous mode, the mobile communication terminal 400 performs communication only through the asynchronous communication network. In the preferred asynchronous mode, the mobile communication terminal 400 performs communication basically through the asynchronous communication network and performs mode switching in order to enable communication through the synchronous communication network when it escapes out of the area of the asynchronous communication network. In the preferred synchronous mode, the mobile communication terminal 400 performs communication basically through the synchronous communication network and performs mode switching in order to enable communication through the asynchronous communication network when it goes into the area of the asynchronous communication network. In the dedicated synchronous mode, the mobile communication terminal 400 performs communication only through the synchronous communication network.

*52Hereinafter, a method for mode switching of an MMMB mobile communication terminal according to a first embodiment of the present invention will be described with reference to FIGS. 4 through 6. According to the first embodiment of the present invention, the MMMB mobile communication terminal shifts from the asynchronous mode to the synchronous mode based on the intensity of signals received from the asynchronous communication network.

Figure 4:
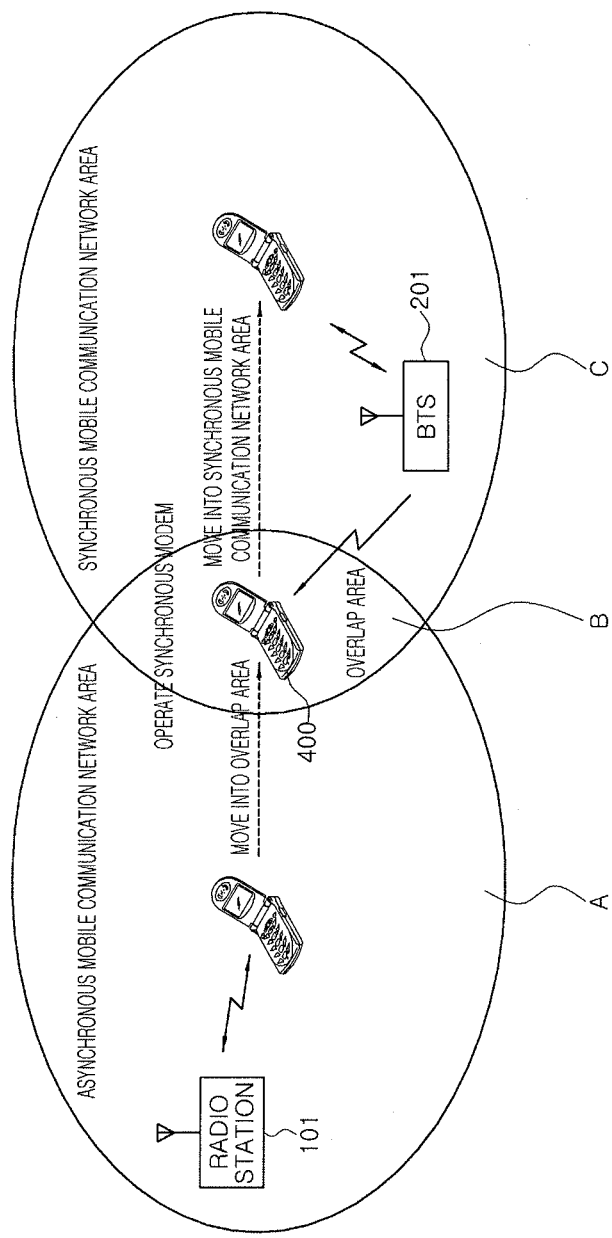
FIG. 4 is a view for illustrating the concept of mode switching of a MMMB mobile communication terminal according to the present invention.

FIG. 4 is a view for illustrating the concept of mode switching of a MMMB mobile communication terminal according to the present invention.

As the mobile communication terminal 400 moves from an area A of the asynchronous communication network to a boundary area B between the asynchronous communication network and the synchronous communication network, the mobile communication terminal 400 receives a signal from the asynchronous network radio station 101 with a reduced intensity. Here, the mobile communication terminal 400 determines based on the measured intensity of the signal from the asynchronous network whether to perform mode switching between the asynchronous mode and the synchronous mode.

The intensity of the signal from the asynchronous network can be obtained based on a ratio (expressed as Ec/Io; Energy of Carrier/Interference of Others) of the signal intensity of the pilot channel to the magnitude of all received noise, a receive (Rx) power expressed as RSSI (Received Signal Strength Indicator), a Received Signal Code Power (RSCP), etc.

From among those parameters, Ec/Io excessively changes according to the surrounding radio environments. In contrast, RSSI and RSCP have a nearly constant threshold value because RSSI is a receive power of the mobile communication terminal and RSCP is a value obtained through the decoding of the signal received by the mobile communication terminal.

Therefore, the present invention employs RSSI or RSCP instead of Ec/Io in measuring the signal intensity. Hereinafter, a method using RSCP will be described, although the same method can be applied to RSSI also.

Figure 5:
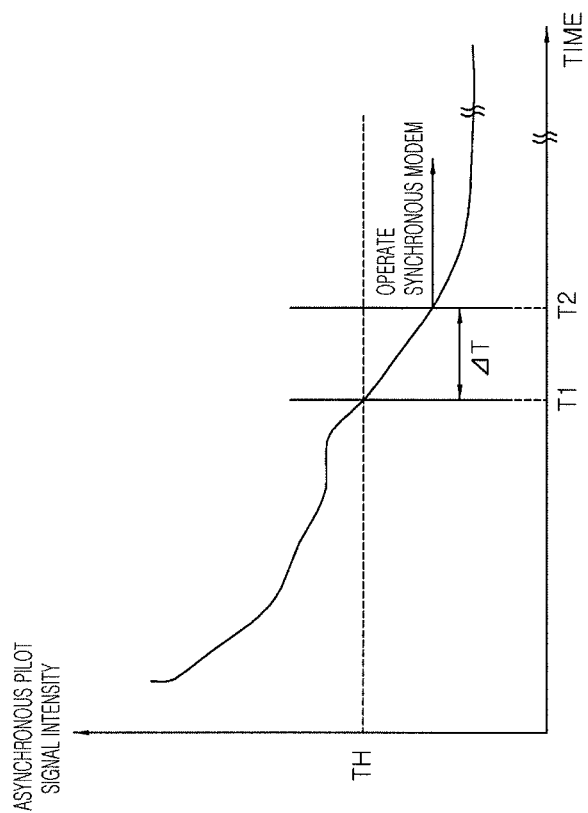
FIG. 5 is a graph for illustrating a mode switching based on a signal intensity in a method for mode switching according to the first embodiment of the present invention.

FIG. 5 is a graph for illustrating a mode switching based on a signal intensity in a method for mode switching according to the first embodiment of the present invention. Here, the signal intensity will be described based on RSCP.

As noted from FIG. 5, when the signal intensity lowers below a preset threshold value TH, the mobile communication terminal 400 recognizes that it is currently escaping from the area of the asynchronous communication network and determines if such a state continues during a predetermined time interval T. When such a state continues during a predetermined time interval T, the mobile communication terminal 400 prepares mode switching from the asynchronous mode to the synchronous mode by operating the synchronous modem. In the state where the synchronous modem is operated, when the signal from the radio station of the asynchronous communication network is released, the mobile communication terminal 400 determines that it has escaped from the area A of the asynchronous communication network and entered the area C of the asynchronous communication network. Then, the mobile communication terminal 400 instantly connects with the synchronous communication network through the synchronous modem, thereby completing the mode switching.

Figure 6:
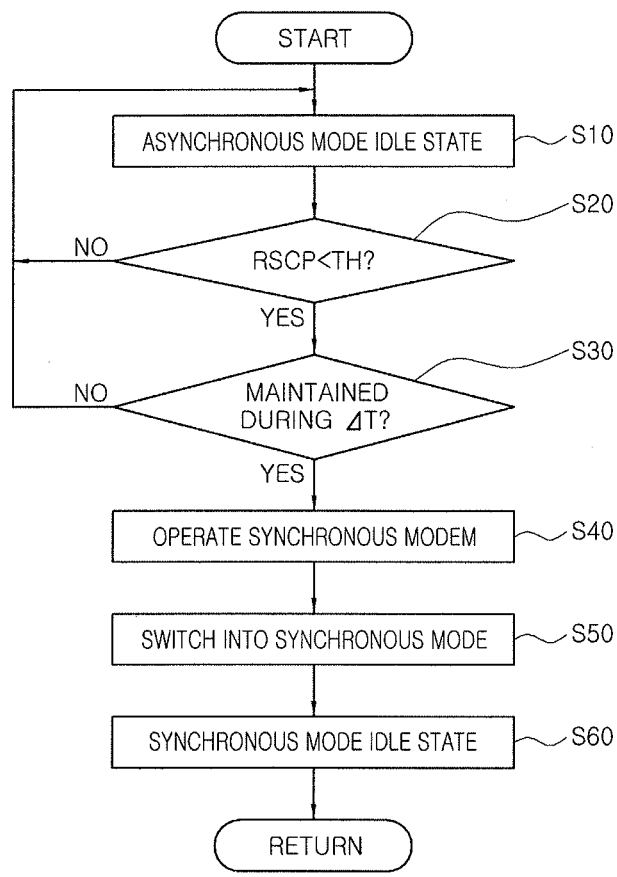
FIG. 6 is a flowchart of the method for mode switching according to the first embodiment of the present invention.

FIG. 6 is a flowchart of the method for mode switching according to the first embodiment of the present invention. The method for mode switching according to the first embodiment of the present invention is a method performed when the MMMB mobile communication terminal is in an idle state. Referring to FIG. 6, when the mobile communication terminal 400 is in an idle state in the area of the asynchronous communication network 100 (step S10), the main processor 443 determines if RSCP has a value lower than the preset threshold value TH (step S20).

When it is determined in step S20 that RSCP has a value lower than the preset threshold value TH, the main processor 443 determines if the state in which RSCP has a value lower than the preset threshold value TH is maintained during a predetermined time interval T(step S30).

When it is determined in step S30 that the state in which RSCP has a value lower than the preset threshold value TH is maintained during a predetermined time interval T, the main processor 443 operates the synchronous modem 434 for communication with the synchronous communication network 200 (step S40). Then, the main processor 443 converts the current communication mode into the synchronous mode (step S50) and then goes into a synchronous mode idle state (step S60).

Next, a method for mode switching of an MMMB mobile communication terminal according to the second embodiment of the present invention will be described in detail with reference to FIG. 7. The second embodiment of the present invention is different from the first embodiment in that the method for mode switching according to the second embodiment of the present invention is performed when the MMMB mobile communication terminal is in a traffic state.

Figure 7:
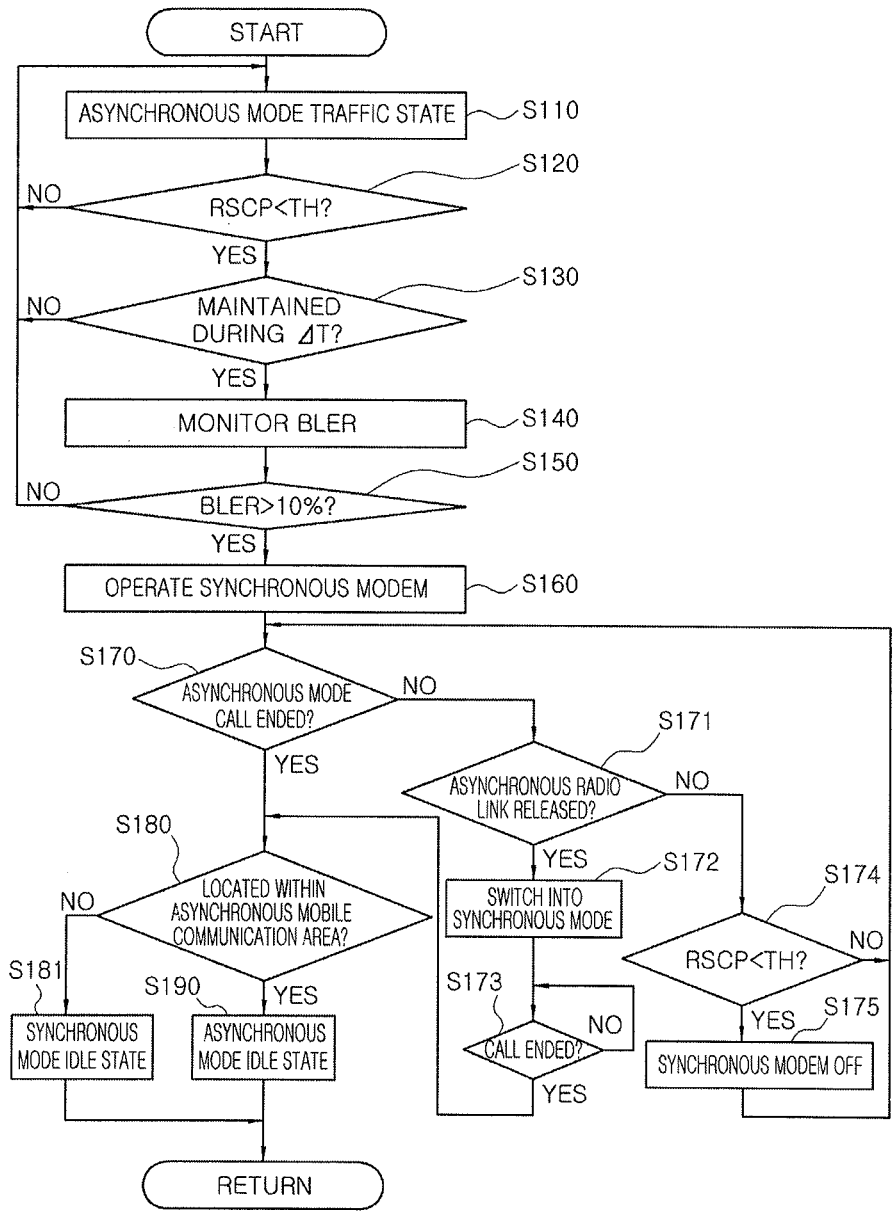
FIG. 7 is a flowchart of a method for mode switching according to the second embodiment of the present invention.

FIG. 7 is a flowchart of a method for mode switching according to the second embodiment of the present invention.

Referring to FIG. 7, when the mobile communication terminal 400 is in a traffic state in the area of the asynchronous communication network 100 (step S110), the main processor 443 determines if RSCP has a value lower than the preset threshold value TH (step S120).

When it is determined in step S120 that RSCP has a value lower than the preset threshold value TH, the main processor 443 determines if the state in which RSCP has a value lower than the preset threshold value TH is maintained during a predetermined time interval T(step S130).

When it is determined in step S130 that the state in which RSCP has a value lower than the preset threshold value TH is maintained during a predetermined time interval T, the main processor 443 monitors a BLock Error Rate (BLER) which indicates the rate of defective blocks per second received at the radio end (step S140).

Then, when it is determined in step S150 that the BLER monitored in step S140 exceeds a preset threshold value (e.g. about 10%), the main processor 443 operates the synchronous modem 434 in order to prepare communication with the synchronous communication network 200 (step S160).

Here, steps S140 and S150 may be omissible because they are necessary only to compensate for and are not indispensable in the second embodiment of the present invention. In the case where steps S140 and S150 are omitted, when it is determined in step S130 that the state in which RSCP has a value lower than the preset threshold value TH is maintained during a predetermined time interval T, the main processor 443 operates the synchronous modem 434 in order to prepare communication with the synchronous communication network 200 (step S160).

In this case, even after operating the synchronous modem 434, the main processor 443 does not attempt registration of the synchronous communication network 200. Further, the main processor 443 determines if the asynchronous mode call currently in a traffic state has ended or not (step S170).

When it is determined in step S170 that the traffic state of the asynchronous mode call has been ended, the main processor 443 determines if the mobile communication terminal 400 is located within the area of the asynchronous communication network 100 in order to go into an idle state (step S180).

When it is determined in step S180 that the mobile communication terminal 400 is located within the area of the asynchronous communication network 100, the main processor goes into the asynchronous mode idle state (step S190) in which the synchronous modem 434 operated in step S160 is inactivated.

However, when it is determined in step S180 that the mobile communication terminal 400 is not located within the area of the asynchronous communication network 100, which means that the mobile communication terminal 400 is located within the area of the synchronous communication network, the main processor 443 goes into the synchronous mode idle state (step S181) in which the asynchronous modem 424 is inactivated.

Meanwhile, when it is determined in step S170 that the traffic state of the asynchronous mode call has not ended yet, the main processor 443 determines if the radio link with the asynchronous communication network 100 has been released or not (step S171). Specifically, the main processor 443 determines whether the mobile communication terminal 400 has escaped from the area of the asynchronous communication network 100, and performs mode switching into the synchronous mode through the synchronous modem 434 started its operation in step S160 when it is determined that the mobile communication terminal 400 has escaped from the area of the asynchronous communication network 100 (step S172).

Then, the main processor 443 determines if the call has been ended or not (step S173). When it is determined in step S173 that the call has been ended, the main processor 443 performs step S180 and determines if the mobile communication terminal 400 is currently located within the area of the asynchronous communication network 100 in order to go into the idle state. When it is determined in step S180 that the mobile communication terminal 400 is located within the area of the asynchronous communication network 100, the main processor goes into the asynchronous mode idle state (step S190) in which the synchronous modem 434 started its operation in step S160 is inactive.

However, when it is determined in step S180 that the mobile communication terminal 400 is not located within the area of the asynchronous communication network 100, which means that the mobile communication terminal 400 is located within the area of the synchronous communication network, the main processor 443 goes into the synchronous mode idle state (step S181) in which the asynchronous modem 424 is inactivated.

Then, when it is determined in step S171 that the radio link with the asynchronous communication network 100 has not been released, the main processor 443 determines if the RSCP has a value exceeding a preset threshold value TH or not in order to determine if the mobile communication terminal 400 is currently located within the area of the asynchronous communication network 100 or not (step S174).

When it is determined in step S174 that the RSCP has a value exceeding the preset threshold value TH, the main processor 443 determines that the mobile communication terminal 400 is currently located within the area of the asynchronous communication network 100 and turns off the currently operating synchronous modem 434 (step S175), and then proceeds to step S170.

Although the previous embodiment has been described by using the parameter RSCP of the received signal code power as an example, the same can be said in steps S20, S120 and S174 by using the power value RSSI of the received signal itself instead of the RSCP.

Further, it is possible to realize the present invention by using both of the parameters RSCP and RSSI, specifically, by measuring the received signal code power and the power value RSSI of the received signal itself and then comparing them with preset reference values in steps S20, S120 and S174.

Figure 8:
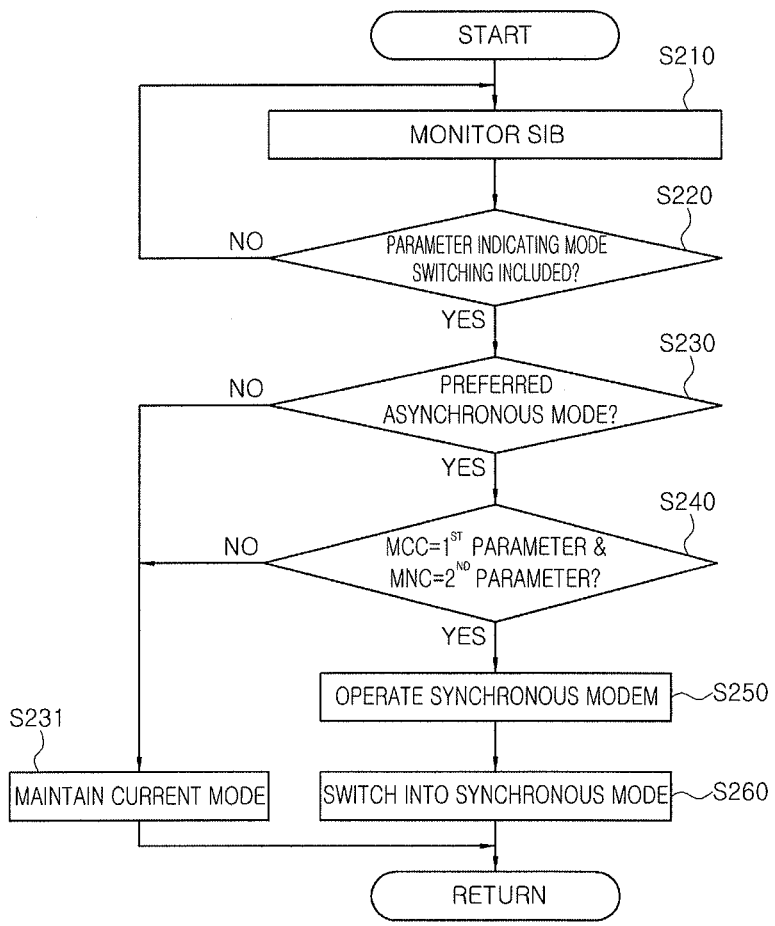
FIG. 8 is a flowchart of a method for mode switching according to the third embodiment of the present invention.

Hereinafter, a method for mode switching of an MMMB mobile communication terminal according to the third embodiment of the present invention will be described in detail with reference to FIG. 8. According to the third embodiment of the present invention, the mode switching from the asynchronous mode to the synchronous mode is performed based on the system information block transmitted from the asynchronous communication network. FIG. 8 is a flowchart of a method for mode switching according to the third embodiment of the present invention.

Referring to FIG. 8, the mobile communication terminal monitors system information blocks of each cell transmitted from a radio station of the asynchronous communication network while performing cell selection (step S210). Further, the mobile communication terminal determines if a parameter in the monitored system information block has been preset to indicate mode switching into the synchronous communication network (step S220).

When it is determined in step S220 that a parameter in the monitored system information block has been preset to indicate mode switching into the synchronous communication network, the mobile communication terminal determines if the terminal mode is currently set as the preferred asynchronous mode (step S230). In the preferred asynchronous mode, the mobile communication terminal first connects with the asynchronous communication network and then connects with the synchronous communication network when it fails to connect with the asynchronous communication network.

When it is determined in step S230 that the terminal mode is currently set as the preferred asynchronous mode, the mobile communication terminal determines if a Mobile Country Code (MCC) contained in the system information block is a preset country code ($1^{st}$ parameter; for example, a parameter having a value of 450 (MCC=450) for Republic of Korea) and if a Mobile Network Code (MNC) is a preset network code ($2^{nd}$ parameter; for example, a parameter having a value of 05 (MNC=05) for SK Telecom Co., Ltd.) in step S240.

When it is determined in step S240 that the MCC is preset as the first parameter and the MNC is preset as the second parameter, the mobile communication terminal determines that it is necessary to shift into the synchronous mode and operates the synchronous modem (step S250). After operating the synchronous modem, the mobile communication terminal switches the current communication mode (asynchronous mode) to the synchronous mode (step S260).

When it is determined in step S230 that the current terminal mode is not the preferred asynchronous mode, for example, when the currently set terminal mode is the dedicated asynchronous mode, the mobile communication terminal does not perform the mode switching and maintains the current asynchronous mode even though the system information block satisfies conditions for the mode switching (step S231).

Also, when it is determined in step S240 that the MCC is not preset as the first parameter or the MNC is not preset as the second parameter, the mobile communication terminal does not perform the mode switching and maintains the current asynchronous mode even though the system information block satisfies conditions for mode switching (step S231).

Next, a method for mode switching of an MMMB mobile communication terminal according to the fourth embodiment of the present invention will be described in detail with reference to FIG. 9. According to the fourth embodiment of the present invention, the mobile communication terminal performs the mode switching from the asynchronous mode to the synchronous mode based on overhead message information (e.g. base ID information) transmitted from the synchronous communication network.

Figure 9:
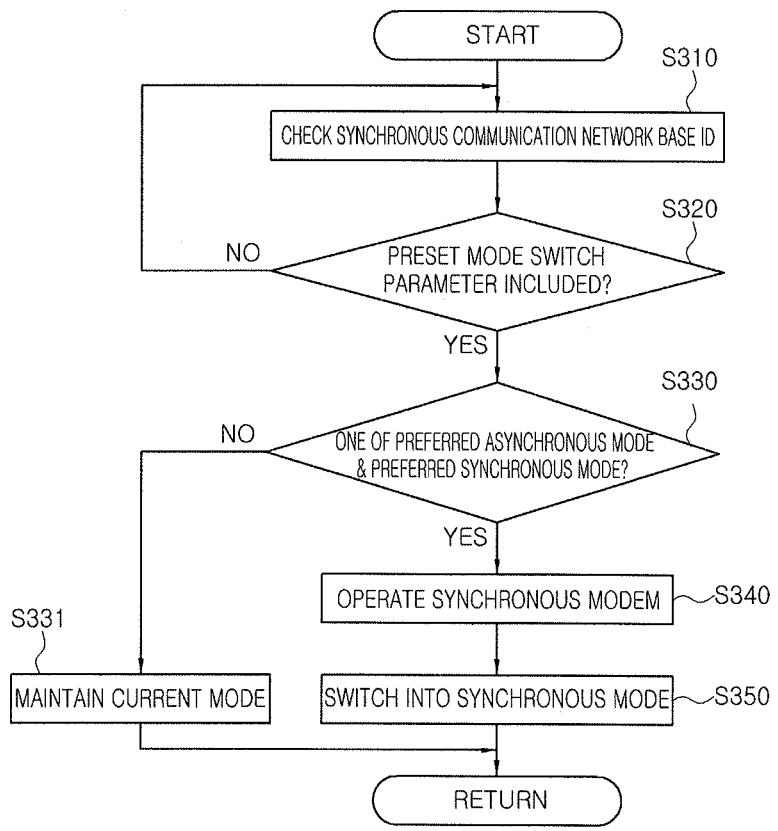
FIG. 9 is a flowchart of a method for mode switching according to the fourth embodiment of the present invention.

FIG. 9 is a flowchart of a method for mode switching according to the fourth embodiment of the present invention.

Referring to FIG. 9, the mobile communication terminal in communication through the synchronous communication network checks overhead message information of the BSC 202 of the synchronous communication network 200 (step S310). Then, the MCT determines if the base ID information found in step S310 includes a preset mode switch parameter (step S320). Here, the mode switch parameter is set at a bit at a predetermined ordinal position (the second bit in the present embodiment) from the Most Significant Bit (MSB) in the base ID and is a parameter for notifying the overlap area between the asynchronous communication network and the synchronous communication network.

When it is determined in step S320 that the base ID information found in step S310 includes a preset mode switch parameter, the mobile communication terminal determines if the terminal mode is currently set as one of the preferred asynchronous mode and the preferred synchronous mode or not (step S330). In the preferred asynchronous mode, the mobile communication terminal first connects with the asynchronous communication network and then connects with the synchronous communication network when it fails to connect with the asynchronous communication network. In the preferred synchronous mode, the mobile communication terminal first connects with the synchronous communication network and then connects with the asynchronous communication network when it fails to connect with the synchronous communication network.

When it is determined in step S330 that the terminal mode is currently set as one of the preferred asynchronous mode and the preferred synchronous mode, the mobile communication terminal determines the mode switching into the asynchronous mode and operates the asynchronous modem (step S340). Then, the mobile communication terminal switches the current communication mode (synchronous mode) to the asynchronous mode (step S350).

When it is determined in step S330 that the current terminal mode is neither the preferred asynchronous mode nor the preferred synchronous mode but is the dedicated synchronous mode, the mobile communication terminal does not perform the mode switching and maintains the current synchronous mode (step S331).

Figure 10:
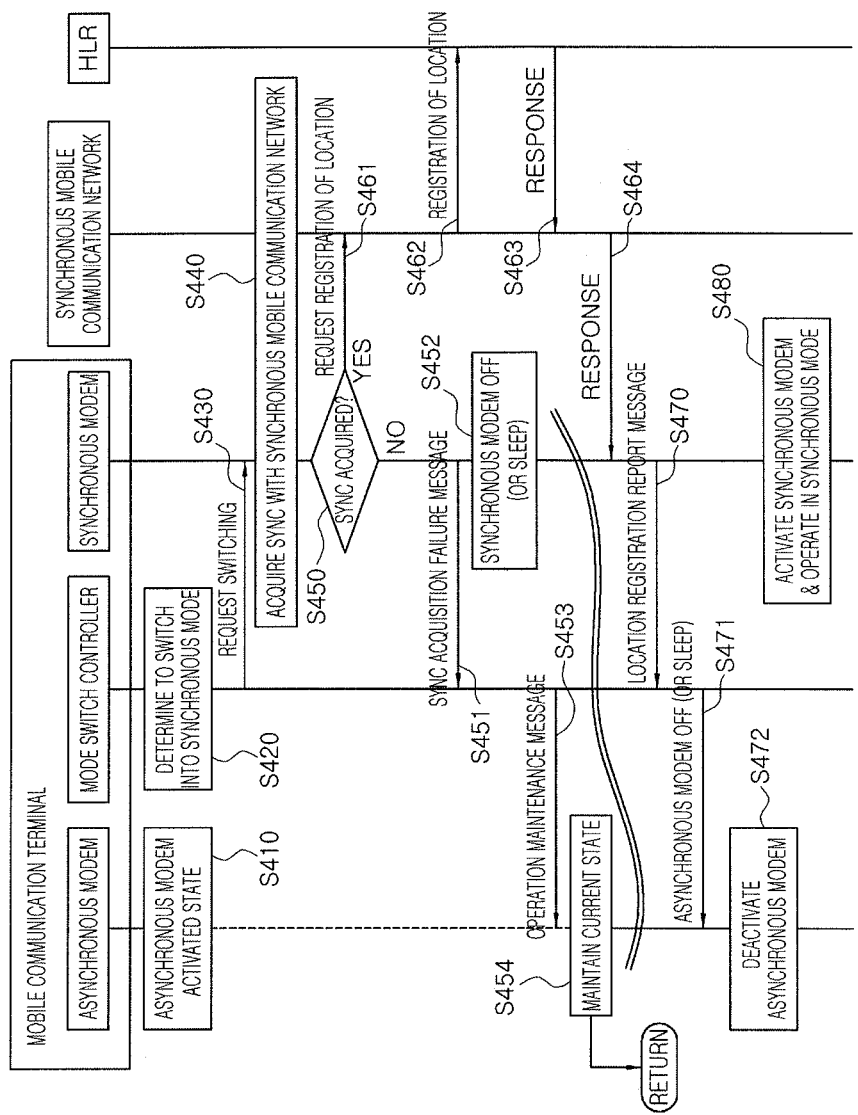
FIG. 10 is a flowchart of a method for mode switching according to the fifth embodiment of the present invention.

Next, a method for mode switching of an MMMB mobile communication terminal according to the fifth embodiment of the present invention will be described in detail with reference to FIG. 10. The method according to the fifth embodiment of the present invention is a specific method in which the mode switching from the asynchronous mode to the synchronous mode is first determined and the synchronous modem is then inactivated and the asynchronous modem is activated in the mobile communication terminal, so that the mobile communication terminal operates in the asynchronous mode. FIG. 10 is a flowchart of a method for mode switching according to the fifth embodiment of the present invention.

Referring to FIG. 10, the mobile communication terminal 400 in communication through the synchronous communication network operates in the synchronous mode through the synchronous modem (step S410). Then, when the mode switching from the asynchronous mode to the synchronous mode is determined as described above (step S420), the mode switch controller 447 requests mode switching to the asynchronous modem 434 (step S430). Then, the asynchronous modem 434 operates to detect a signal from the asynchronous communication network (step S440) and determines if there is a normally detected signal (step S450).

When it is determined in step S450 that there is no WCDMA signal, the asynchronous modem 434 transmits a sync acquisition failure message to the mode switch controller 447 (step S451) and goes into an off state or a sleep state (step S452).

Upon receiving the sync acquisition failure message in step S451, the mode switch controller 447 recognizes the failure in acquisition of sync of the asynchronous communication network and transmits an operation maintenance message to the synchronous modem 424 to maintain the current state (step S453). Then, the synchronous modem 424 maintains the current state (step S454) and the mobile communication terminal 400 continues to operate in the synchronous mode.

Meanwhile, when it is determined in step S450 that a WCDMA signal has been detected and the sync has been acquired, the asynchronous modem 434 requests registration of location to the asynchronous communication network (step S461). When the location information of the mobile communication terminal 400 in the asynchronous communication network is registered in the HLR 207 in response to the request (step S462), the HLR 207 transmits a response reporting the location registration (step S463).

Further, the asynchronous communication network transmits the response reporting the location registration to the synchronous modem 434 (step S464).

After receiving the response in step 464, the synchronous modem 434 transmits to the mode switch controller 447 a message reporting the current state, that is, a message reporting that the location registration to the asynchronous communication network has been completed (step S470). Then, the asynchronous modem 424 is activated and the mobile communication terminal 400 operates in the asynchronous mode (step S480).

Here, upon receiving the location registration completion message from the asynchronous modem 434, the mode switch controller 447 recognizes a success in mode switching into the asynchronous communication network. Then, the mode switch controller 447 transmits to the synchronous modem 424 a message in order to deactivate the synchronous modem 424 into the off state or sleep state (step S471). Then, the synchronous modem 424 is deactivated (step S472) and the mode switching is completed.

Next, a method for mode switching of an MMMB mobile communication terminal according to the sixth embodiment of the present invention will be described in detail with reference to FIG. 11. The method according to the sixth embodiment of the present invention is a method performed when the synchronous communication network is defective or has such a weak electric field that it is impossible to register the location in the course of the mode switching from the asynchronous mode to the synchronous mode.

Specifically, when the asynchronous communication network is defective or has such a weak electric field that it is impossible to register the location, the mode transition may be repeatedly tried alternately into the synchronous communication network and the asynchronous communication network, thereby causing a ping-pong phenomenon in which the mobile communication terminal continuously stays in a communication disabled state. Therefore, when the mobile communication terminal receives a mode switch command from the synchronous communication network, the mobile communication terminal tries registration of location by detecting an asynchronous signal in the asynchronous mode. When there is a problem in the switching, the mobile communication terminal returns to the synchronous mode and periodically tries detection of asynchronous signal in order to perform the mode switching into the asynchronous mode.

Figure 11:
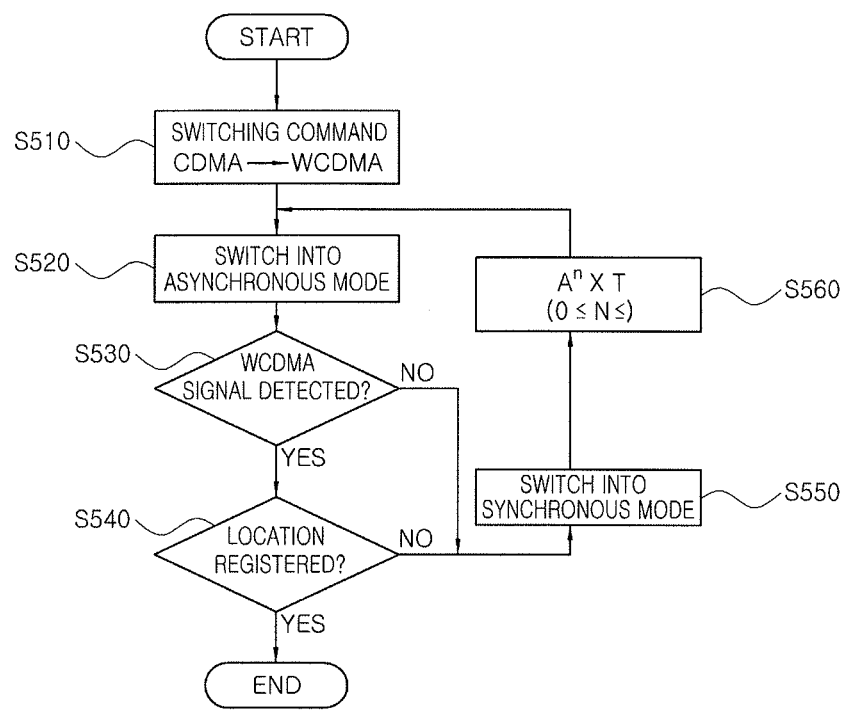
FIG. 11 is a flowchart of a method for mode switching according to the sixth embodiment of the present invention.

FIG. 11 is a flowchart of a method for mode switching according to the sixth embodiment of the present invention.

Referring to FIG. 11, when the mobile communication terminal 400 receives a switching command signal from the synchronous communication network 200 and determines to perform the switching from the synchronous communication network 200 to the asynchronous communication network 100 (step S510), the mobile communication terminal 400 switches its current communication mode from the synchronous mode to the asynchronous mode (step S520) and determines if an asynchronous signal is detected (step S530).

When an asynchronous signal is detected, the mobile communication terminal 400 determines if the registration of location to the asynchronous communication network is completed (step S540). When the registration of location is completed, the mobile communication terminal 400 performs communication through the asynchronous communication network. Here, the registration of location to the asynchronous communication network refers to registration of location to a Circuit Network (CS) or a Packet Service (PS) network.

Further, when an asynchronous signal is not detected in step S530 or when it is impossible to perform communication in the asynchronous mode due to failure in the registration of location by some problems in the asynchronous communication network, the mobile communication terminal 400 switches back to the synchronous mode (step S550).

Next, the mobile communication terminal 400 waits a predetermined time interval and counts the number of times of the waiting (step S560) and then switches back to the asynchronous mode (step S520) and determines if an asynchronous signal is detected (step S530). This feedback process is repeated until the location is registered.

Here, it is preferable to gradually increase the counting interval (which corresponds to a time interval of detecting the asynchronous signal) according to a predetermined basis reflecting the number of times by which the asynchronous signal has been detected. A counting parameter for determining the counting interval is included in the system parameter transmitted from the radio station of the asynchronous communication network to the mobile communication terminal 400.

Therefore, upon receiving a mode switch command, the mobile communication terminal 400 determines the counting interval for detecting the asynchronous signal based on the counting parameter, waits the counting interval and counts the number of times, and then searches an asynchronous signal.

It is preferred that a basic parameter capable of replacing the counting parameter is preset and stored in the mobile communication terminal, so that the mobile communication terminal 400 can determine the counting interval based on the stored basic parameter when it fails to receive the counting parameter.

The parameter used for the counting may contain information of, for example, a unit interval T for searching the asynchronous signal, a modulus A for determining the time interval of asynchronous signal searching, and a maximum threshold Nmax for the number of times for searching the asynchronous signal. When the number of times by which the mobile communication terminal 400 performed searching for the asynchronous signal is put as 'n' the mobile communication terminal 400 determines the counting interval by Equation (1) below.

$$t = A^n * T \quad (1)$$

In Equation (1), 'n' (the number of times of searching for the asynchronous signal) has a value increasing by one each time from 1 to 'Nmax' In other words, by Equation (1), the initial counting interval during which the mobile communication terminal 400 waits after failing the registration of location first time is calculated as '$A^n * T$' the counting interval during which the mobile communication terminal 400 waits after failing the registration of location first time twice is calculated as '$A^2 * T$' and the counting interval during which the mobile communication terminal 400 waits after failing the registration of location first time twice is calculated as '$A^3 * T$'.

When the number of times of searching the asynchronous signal exceeds the threshold value 'Nmax' due to repeated failure in detecting the asynchronous signal, the counting interval is fixed to a value '$A^{Nmax} * T$' from then.

Instead of the above parameter and equation (1), various parameters and equations may be used in order to determine the counting interval, and 'n' may have a value between 1 and 'Nmax'.

The present invention is applied to only the cases where the communication mode of the mobile communication terminal 400 is set as the preferred asynchronous mode or the preferred synchronous mode and is not applied to the cases where the communication mode of the mobile communication terminal 400 is set as the dedicated asynchronous mode or the dedicated synchronous mode. Therefore, upon receiving the mode switch command from the synchronous communication network, the mobile communication terminal 400 checks the current communication mode and preferably searches an asynchronous signal when the current communication mode is one of the preferred asynchronous mode and the preferred synchronous mode.

Next, a method for mode switching of an MMMB mobile communication terminal according to the seventh embodiment of the present invention will be described in detail with reference to FIGS. 12 and 13.

Figure 12:
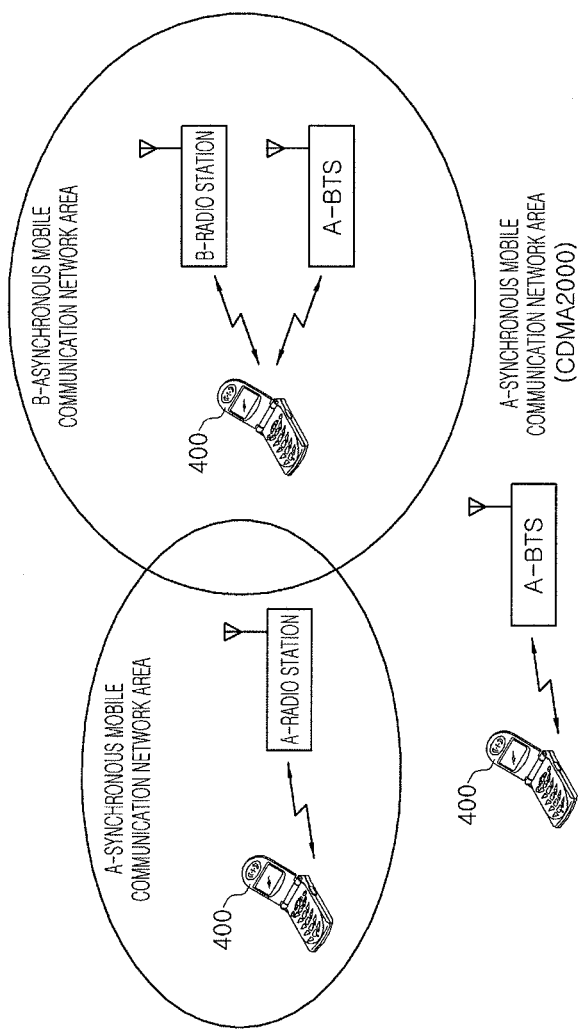
FIG. 12 is a view for illustrating the concept of mode switching according to the seventh embodiment of the present invention.

FIG. 12 is a view for illustrating the concept of mode switching according to the seventh embodiment of the present invention.

Referring to FIG. 12, the synchronous communication network area of company A includes a portion of an asynchronous communication network area of company A and a portion of an asynchronous communication network area of company B. In a case where the mobile communication terminal 400 is a subscriber terminal of company A and its current communication mode is the preferred asynchronous mode, the mobile communication terminal 400 performs communication through the asynchronous communication network of company A in an overlap area between the asynchronous communication network area of company A and the synchronous communication network area of company A. In the sole synchronous communication network area of company A, the mobile communication terminal 400 switches into the synchronous mode and performs communication through the synchronous communication network of company A.

When the mobile communication terminal 400 in the preferred asynchronous mode escapes from the asynchronous communication network area of company A and tries registration of location in an overlap area between the asynchronous communication network area of company B and the synchronous communication network area of company A, the mobile communication terminal 400 first searches for an asynchronous signal from the asynchronous communication network of company B instead of the synchronous communication network of company A and requests registration of location to the asynchronous communication network of company B.

Then, the asynchronous communication network of company B refers to subscriber information of the mobile communication terminal 400 having requested the registration of its location. When the mobile communication terminal 400 having requested the registration of location is not a subscriber of company B, the asynchronous communication network of company B denies the registration of location. Then, the mobile communication terminal 400 having failed in the registration of location switches into an emergency communication state in which the mobile communication terminal 400 can process only an emergency call through the asynchronous communication network of company B.

Further, the registration of location may also be denied when the mobile communication terminal 400 is located within the asynchronous communication network area of company A. In this case also, the mobile communication terminal 400 switches into an emergency communication state. In the present embodiment, when the mobile communication terminal 400 switches into an emergency communication state due to denial of registration of location by the asynchronous communication network, the mobile communication terminal 400 switches its communication mode into a synchronous mode so that all service can be provided to the mobile communication terminal 400 through the synchronous communication network of company A.

Figure 13:
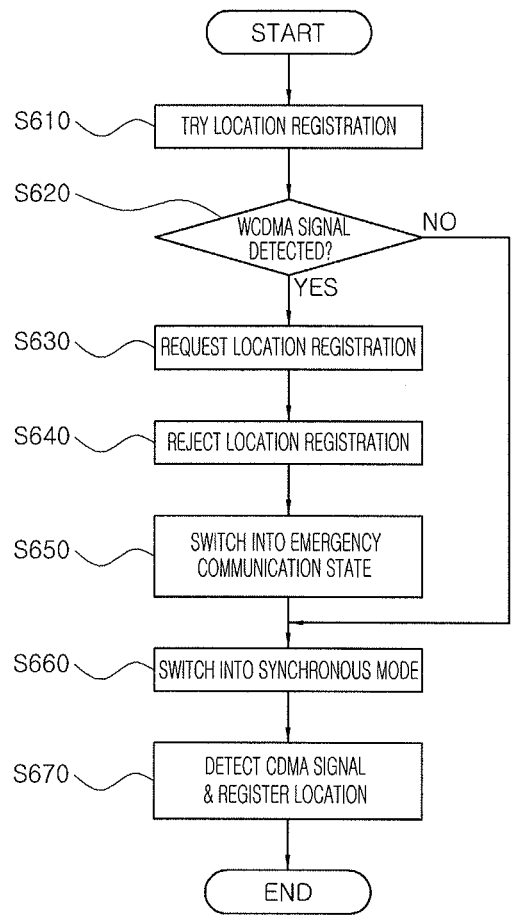
FIG. 13 is a flowchart of a method for mode switching according to the seventh embodiment of the present invention.

FIG. 13 is a flowchart of a method for mode switching according to the seventh embodiment of the present invention.

As shown in FIG. 13, when the mobile communication terminal 400 tries registration of location (step S610), the mobile communication terminal 400 first determines if an asynchronous signal is detected (step S620). Here, searching of the synchronous signal is performed when the mobile communication terminal 400 is a terminal of the preferred asynchronous mode and is currently in the asynchronous mode. The registration of location includes that of all cases, including registration when the power is on, periodical registration, registration according to movement between cells, etc.

As a result of the determination, when an asynchronous signal is detected, the mobile communication terminal 400 requests registration of location to a corresponding asynchronous communication network (step S630). When the mobile communication terminal 400 receives a location registration reject message in response to the request (step S640), the mobile communication terminal 400 switches into an emergency communication state in which the mobile communication terminal 400 can process only an emergency call (step S650).

The location registration reject message may be a message transmitted by the corresponding asynchronous communication network when the corresponding asynchronous communication network cannot find subscriber information through reference to the information stored in the asynchronous communication network or a message due to some problems in the asynchronous communication network.

Then, the mobile communication terminal 400 switches its communication mode into a synchronous mode (step S660) and detects a synchronous signal and registers its location to the synchronous communication network (step S670), so that the mobile communication terminal 400 can perform the communication through the synchronous communication network.

Further, when an asynchronous signal is not detected in step S620, the mobile communication terminal 400 switches its communication mode into the synchronous mode (step S660) and detects a synchronous signal and registers its location to the synchronous communication network (step S670).

The present invention is applied to only the cases where the communication mode of the mobile communication terminal 400 is set as the preferred asynchronous mode or the preferred synchronous mode and is not applied to the cases where the communication mode of the mobile communication terminal 400 is set as the dedicated asynchronous mode or the dedicated synchronous mode.

Therefore, it is preferred that, in trying to register location, the mobile communication terminal 400 checks the current communication mode and searches an asynchronous signal when the current communication mode is the preferred asynchronous mode.

In the above description, the mobile communication terminal switches its communication mode into a synchronous mode after switching into an emergency communication state. However, according to the present invention, the mobile communication terminal may switch its communication mode into a synchronous mode upon receiving the location registration reject message from the asynchronous communication network before entering an emergency communication state, because it is meaningless for the mobile communication terminal to actually enter the emergency communication state.

INDUSTRIAL APPLICABILITY

As can be seen from the foregoing, the present invention provides a multi-mode multi-band mobile communication terminal and a mode switching method thereof, which can minimize interruption in the communication when the mobile communication terminal moves from an asynchronous mobile communication network area to a synchronous mobile communication network area.

Also, the present invention provides a multi-mode multi-band mobile communication terminal and a mode switching method thereof, which can minimize a ping-pong phenomenon when the mobile communication terminal automatically performs mode switching between a WCDMA mode and a CDMA mode. While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A multi-mode mobile communication terminal for switching between modes during cell selection, the multi-mode mobile communication terminal configured to connect to a plurality of mobile communication networks with different communication protocols, the multi-mode mobile communication terminal comprising:
    a first radio apparatus configured to communicate a radio signal via a first mobile communication network and receive a system information block broadcasted from the first mobile communication network, based on a protocol of the first mobile communication network;
    a second radio apparatus configured to communicate a radio signal via a second mobile communication network, based on a protocol of the second mobile communication network, wherein the second mobile communication network is different from the first mobile communication network; and
    a mode switch controller configured to control the operation of both the first radio apparatus and the second radio apparatus,
    wherein the mode switch controller is configured to
        select a first cell of the first mobile communication network when a signal from the first cell is detected through the first radio apparatus, in a state that the multi-mode mobile communication terminal is not connected to the first mobile communication network and the second mobile communication network,
        receive, through the first radio apparatus, the system information block broadcasted from the first cell, the system information block including information on a preferred mobile communication network,
        determines whether mode switching from the first mobile communication network to the second mobile communication network is to be performed based on the information on the preferred mobile communication network included in the system information block, and perform the mode switching based on the determination by deactivating the first radio apparatus and activating the second radio apparatus.

2. The multi-mode mobile communication terminal of claim 1, wherein the system information block contains a Mobile Country Code (MCC) and a Mobile Network Code (MNC), and the mode switch controller is configured to identify the Mobile Country Code and the Mobile Network Code contained in the system information block.

3. The multi-mode mobile communication terminal of claim 1, wherein the system information block includes a parameter related to the mode switching between the first mobile communication network and the second mobile communication network.

4. The multi-mode mobile communication terminal of claim 1, wherein the mode switch controller is configured to check whether the mode switching to the second mobile communication network is enabled, based on a multi-mode mobile communication terminal mode set in the multi-mode mobile communication terminal.

5. The multi-mode mobile communication terminal of claim 1, wherein the second radio apparatus is configured to detect a signal from the second mobile communication network and register a location of the multi-mode mobile communication terminal to the second mobile communication network, during the mode switching from the first mobile communication network to the second mobile communication network.

6. The multi-mode mobile communication terminal of claim 1, wherein the protocol of the first mobile communication network is a 3GPP mobile communication protocol.

7. The multi-mode mobile communication terminal of claim 1, wherein the protocol of the first communication mobile network a 4G mobile communication protocol.

8. A method of performing mode switching at a multi-mode mobile communication terminal during cell selection, the multi-mode mobile communication terminal configured to connect to a plurality of mobile communication networks with different communication protocols, the method comprising:

selecting a first cell of a first mobile communication network when a signal from the first cell is detected in a state that the multi-mode mobile communication terminal is not connected to the first mobile communication network and a second mobile communication network;

monitoring a system information block broadcasted from the first cell, the system information block including information on a preferred mobile communication network;

determining whether mode switching to the second mobile communication network is to be performed, based on the information on the preferred mobile communication network included in the monitored system information block; and performing mode switching to the second mobile communication network as indicated by the system information block so as to connect to a second cell of the second mobile communication network.

9. The method of claim 8, further comprising:

identifying a Mobile Country Code (MCC) and a Mobile Network Code (MNC) contained in the system information block transmitted from the cell of the first mobile communication network.

10. The method of claim 8, further comprising:

checking whether the mode switching to the second mobile communication network is enabled, based on a multi-mode mobile communication terminal mode set in the multi-mode mobile communication terminal.

11. The method of claim 8, wherein the performing mode switching comprises: detecting a signal from the second mobile communication network; and registering a location of the multi-mode mobile communication terminal to the second mobile communication network.

12. The method of claim 8, wherein the first mobile communication network is based on a 3GPP mobile communication protocol.

13. The method of claim 8, wherein the first communication mobile network is based on a 4G mobile communication protocol.

* * * * *